United States Patent
Reddy et al.

(10) Patent No.: US 7,322,414 B2
(45) Date of Patent: Jan. 29, 2008

(54) CROSSLINKABLE-POLYMER COMPOSITIONS AND ASSOCIATED METHODS

(75) Inventors: B. Raghava Reddy, Duncan, OK (US); Larry S. Eoff, Duncan, OK (US); Eldon D. Dalrymple, Duncan, OK (US); Julio Vasquez, Norman, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 135 days.

(21) Appl. No.: 11/170,237

(22) Filed: Jun. 28, 2005

(65) Prior Publication Data

US 2006/0289158 A1    Dec. 28, 2006

(51) Int. Cl.
*E21B 43/27* (2006.01)
(52) U.S. Cl. ...................... 166/300; 166/294
(58) Field of Classification Search ............ None
See application file for complete search history.

(56) References Cited

U.S. PATENT DOCUMENTS

| 4,378,049 | A | * | 3/1983 | Hsu et al. ............... 166/295 |
|---|---|---|---|---|
| 5,836,392 | A | | 11/1998 | Urlwin-Smith ............ 166/295 |
| 6,176,315 | B1 | | 1/2001 | Reddy et al. ............. 166/295 |
| 6,192,986 | B1 | | 2/2001 | Urlwin-Smith ............ 166/295 |
| 6,196,317 | B1 | | 3/2001 | Hardy ..................... 166/295 |
| 6,607,035 | B1 | | 8/2003 | Reddy et al. ............. 166/295 |
| 6,764,981 | B1 | * | 7/2004 | Eoff et al. ............... 507/110 |
| 7,091,160 | B2 | * | 8/2006 | Dao et al. ............... 507/224 |
| 2003/0181543 | A1 | | 9/2003 | Reddy et al. ............. 523/130 |
| 2005/0288190 | A1 | | 12/2005 | Dao ........................ 507/224 |
| 2006/0293446 | A1 | | 12/2006 | Reddy .................... 424/488 |

OTHER PUBLICATIONS

U.S. Appl. No. 11/170,280, entitled "Crosslinkable-Polymer Compositions and Associated Methods" to B. Raghava Reddy, et al, Jun. 28, 2005.

* cited by examiner

*Primary Examiner*—Zakiya W. Bates
*Assistant Examiner*—Angela DiTrani
(74) *Attorney, Agent, or Firm*—Robert A. Kent; Baker Botts, L.L.P.

(57) ABSTRACT

Crosslinkable-polymer compositions are provided that may be useful for, among other things, reducing, stopping, or diverting the flow of fluids in subterranean formations. The crosslinkable-polymer compositions may comprise an aqueous fluid, a chitosan-reacting polymer, chitosan, and a gelation-retarding additive comprising an acid derivative. Various methods of use are also provided.

20 Claims, No Drawings

CROSSLINKABLE-POLYMER COMPOSITIONS AND ASSOCIATED METHODS

CROSS-REFERENCE TO RELATED APPLICATIONS

The present invention is related to co-pending U.S. application Ser. No. 11/170,280 entitled "Crosslinkable-Polymer Compositions and Associated Methods," filed concurrently herewith, the entire disclosure of which is incorporated herein by reference.

BACKGROUND

The present invention relates to treatment fluids useful in subterranean applications and more particularly, to crosslinkable-polymer compositions that comprise an aqueous fluid, chitosan, a chitosan-reacting polymer, and a gelation-retarding additive comprising an acid derivative, and associated methods.

At some point in the life of a well, it may be desirable to mitigate the flow of fluids through a portion of a subterranean formation that is penetrated by the well. In some instances, it may be desirable to control the flow of fluids introduced into the well so that the flow of the fluid into high-permeability portions of the formation is mitigated. For example, in an injection well, it may be desirable to seal off high-permeability portions of a subterranean formation that would otherwise accept most of an injected treatment fluid. By sealing off the high-permeability portions of the subterranean formation, the injected treatment fluid may thus penetrate less permeable portions of the subterranean formation.

In other instances, it may be desirable to mitigate the production of undesired fluids (e.g., water) from the well. The production of water with oil and gas from wells constitutes a major problem and expense in the production of oil and gas. While oil and gas wells are usually completed in hydrocarbon-producing formations, a water-bearing zone may occasionally be adjacent to the hydrocarbon-producing formation. In some instances, the higher mobility of the water may allow it to flow into the hydrocarbon-producing formation by way of, among other things, natural fractures and high-permeability streaks. In some circumstances, the ratio of water to hydrocarbons recovered may, over time, become sufficiently high that the cost of producing, separating, and disposing of the water may represent a significant economic loss.

One attempt to mitigate the flow of fluids through a portion of a subterranean formation has been to place crosslinkable-polymer compositions in a well bore so as to cause them to enter the portion of the subterranean formation such that they may crosslink therein. The crosslinking of these compositions tends to produce crosslinked gels, which may eliminate, or at least reduce, the flow of water or other undesirable fluids through the natural fractures and high-permeability streaks in the formations. One particular crosslinkable-polymer composition involves the use of chitosan to crosslink a water-soluble polymer, such as an acrylamide-based polymer.

The time required for a crosslinkable-polymer composition to form the desired crosslinked gel can vary widely. This length of time, sometimes referred to as "gelation time," varies, depending on a number of factors, including the type of crosslinking agent used, the type of polymer used, the type of aqueous fluid used, concentrations of components used, the pH, the temperature, and a variety of other factors. Delaying the gelation of a crosslinkable-polymer composition may be desirable to allow, among other things, pumping of the composition to its desired location. The desired gelation time varies depending on the specific application. For instance, for wells of considerable depth or increased temperature, a longer gelation time may be required to deliver the crosslinkable-polymer composition to its desired destination before the composition forms the crosslinked gel.

In subterranean formations, a wide range of temperatures may be encountered presenting challenges to the use of crosslinkable-polymer compositions therein. For example, if the temperature of the subterranean formation is sufficiently high, the crosslinkable-polymer composition may gel prematurely. To counteract this undesirable possibility, oftentimes, the crosslinkable-polymer composition must be designed such that its gelation time is delayed or retarded. That is, the thickening and gelation characteristics of the crosslinkable-polymer composition must be altered such that the time it takes the crosslinkable-polymer composition to form a crosslinked gel is delayed for an amount of time sufficient to permit the crosslinkable-polymer composition to be pumped to its desired destination.

A number of methods for adjusting the gelation time of crosslinkable-polymer compositions have heretofore been used. For instance, the gelation time of the above mentioned crosslinkable-polymer compositions, that comprise chitosan and a water-soluble polymer, may be lengthened by increasing the level of bulky and/or less reactive monomers in the selected polymer or polymers used. These modifications, however, may still be inadequate to provide the desired gelation times for certain applications.

SUMMARY

The present invention relates to treatment fluids useful in subterranean applications and more particularly, to crosslinkable-polymer compositions that comprise an aqueous fluid, chitosan, a chitosan-reacting polymer, and a gelation-retarding additive comprising an acid derivative, and associated methods.

An embodiment of the present invention provides a method of treating a portion of a subterranean formation. An example of such a method may comprise providing a crosslinkable-polymer composition comprising an aqueous fluid, chitosan, a chitosan-reacting polymer, and a gelation-retarding additive comprising an acid derivative; introducing the crosslinkable-polymer composition into the portion of the subterranean formation; and allowing the crosslinkable-polymer composition to form a crosslinked gel in the portion of the subterranean formation.

An embodiment of the present invention provides a method of diverting a treatment fluid in a subterranean formation. An example of such a method may comprise providing a crosslinkable-polymer composition comprising an aqueous fluid, chitosan, a chitosan-reacting polymer, and a gelation-retarding additive comprising an acid derivative; introducing the crosslinkable-polymer composition into a portion of the subterranean formation; allowing the crosslinkable-polymer composition to form a crosslinked gel in the portion of the subterranean formation; providing the treatment fluid; introducing the treatment fluid into the subterranean formation; and allowing the crosslinked gel to at least substantially divert the treatment fluid to another portion of the subterranean formation.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to treatment fluids useful in subterranean applications and more particularly, to crosslinkable-polymer compositions that comprise an aqueous fluid, chitosan, a chitosan-reacting polymer, and a gelation-retarding additive comprising an acid derivative, and associated methods.

The term, "crosslinkable-polymer composition," as used herein, refers to a composition that under the appropriate conditions (e.g., time, temperature, etc.) forms a crosslinked gel. The term, "crosslinked gel," as used herein refers to a semi-rigid, jelly-like mass formed when the chitosan-reacting polymer and the chitosan combine through a crosslinking reaction. The term, "chitosan-reacting polymer," as used herein refers to a polymer capable of reacting with chitosan. The term, "gelation-retarding additive," as used herein refers to an additive that acts to at least partially delay the crosslinking reaction between the chitosan and the chitosan-reacting polymer, e.g., the gelation of the crosslinkable-polymer compositions.

In certain embodiments, the compositions and methods of the present invention may be useful to alter, block, and/or control the flow of fluids in subterranean formations. Moreover, the crosslinkable-polymer compositions of the present invention may possess desirable environmental properties for performing such operations.

The crosslinkable-polymer compositions of the present invention generally comprise an aqueous fluid, chitosan, a chitosan-reacting polymer, and a gelation-retarding additive comprising an acid derivative. Because chitosan contains an amine group, the chitosan should react, under appropriate conditions (e.g., time, temperature, etc.) with the chitosan-reacting polymer to form a crosslinked gel. Inclusion of the gelation-retarding additive in the crosslinkable-polymer compositions of the present invention may delay this crosslinking reaction between the chitosan-reacting polymer and the chitosan, e.g., the gelation of the crosslinkable-polymer compositions, so that the crosslinkable-polymer compositions may be used in a wider range of applications than would be otherwise possible.

The aqueous fluid used for the crosslinkable-polymer compositions of the present invention may include, but is not limited to, freshwater, seawater, saltwater, or brines (e.g., natural brines, formulated brines, saturated brines, unsaturated brines, etc.), or a mixture thereof. The aqueous fluid may be from any source, provided that it does not adversely affect the crosslinkable-polymer compositions of the present invention. Formulated brines may be manufactured by dissolving one or more soluble salts in water, a natural brine, or seawater. Representative soluble salts include the chloride, bromide, acetate, and formate salts of potassium, sodium, calcium, magnesium, and zinc. To facilitate the dissolution of the chitosan, the aqueous fluid may further contain an organic or inorganic acid, or mixtures thereof. In certain embodiments, the aqueous fluid may be present in the crosslinkable-polymer compositions of the present invention in an amount in the range of from about 65% to about 99.4% by weight of the composition.

The crosslinkable-polymer compositions of the present invention may comprise a chitosan. As used herein, the term "chitosan" is intended to include chitosan and chitosan salts of mineral or organic acids. The chitosan included in the crosslinkable treatment fluids of the present invention may include unoxidized chitosan, oxidized chitosan, or modified chitosan, or mixtures thereof. Chitosan is a beta-(1-4)-polysaccharide of D-glucosamine and is structurally similar to cellulose, except that the C-2 hydroxyl group in cellulose is substituted with a primary amine group in chitosan. Chitosan usually occurs in nature in small amounts and is biodegradable. Chitosan degrading enzymes, namely chitinases, chitosanases, and lysozymes that degrade chitin-derived materials occur in bacteria, fungi, algae, mammals, birds, fish, etc. Chitosan is a partially or fully deacetylated form of chitin. Chitin is a naturally occurring polysaccharide. Structurally, chitin is a polysaccharide consisting of beta-(1-4)2-acetamido-2-deoxy-D-glucose units, some of which are deacetylated. Chitin is not one polymer with a fixed stoichiometry, but a class of polymers of N-acetylglucosamine with different crystal structures and degrees of deacetylation and with fairly large variability from species to species. Typically, chitosan has a degree of deacetylation that is in the range of from about 50% to about 100%. In certain embodiments, such as commercially available chitosan, the chitosan may have a degree of deacetylation that is in the range of from about 70% to 78%.

In certain embodiments, the chitosan may include oxidized chitosan. Suitable chitosan-based compounds that may be oxidized include, but are not limited to, chitosan and chitosan salts of mineral or organic acids. A wide variety of oxidizers may be used to oxidize the chitosan. Examples of suitable oxidizers include, but are not limited to sodium hypochlorite, sodium chlorite, sodium persulfate, sodium periodate, hydrogen peroxide, organic peroxides, peracetic acid, and mixtures thereof.

In certain embodiments, the chitosan may include modified chitosan. The term, "modified chitosan," as used herein, refers to chitosan grafted with additional functional groups, including, but not limited to, carboxymethyl groups, hydroxyethyl groups, hydroxypropyl groups, or combinations thereof. Other functional group modifications may be suitable as recognized by one skilled in the art with the benefit of this disclosure.

Under the appropriate conditions (e.g., time, temperature, etc.), the chitosan should react with the chitosan-reacting polymer to form a crosslinked gel. Descriptions of crosslinked gels formed using chitosan as a crosslinking agent and methods of their use are described, at least in part, in U.S. Pat. Nos. 6,607,035 and 6,764,981, the relevant disclosures of which are herein incorporated by reference.

The chitosan should be included in the crosslinkable-polymer compositions of the present invention in an amount sufficient to provide the desired crosslinking reaction. In certain embodiments, the chitosan may be present in an amount in the range of from about 0.05% to about 5% by weight of the composition. When oxidized chitosan is used, the amount of chitosan may be increased to 15% by weight of the composition.

Chitosan-reacting polymers of the present invention may include any suitable polymer or polymers that are capable of reacting with chitosan. Generally, suitable polymers include, among others, those polymers comprising a carbonyl group, such as, for example, saturated or unsaturated acrylamide-based polymers. Examples include, but are not limited to, polyacrylamide, acrylamide copolymers, polyvinyl pyrrolidone, 2-acrylamido-2-methylpropane sulfonic acid/acrylamide copolymers, sulfonated styrene/maleic anhydride copolymers, vinylpyrrolidone/2-acrylamido-2-methylpropane sulfonic acid/acrylamide terpolymers, 2-acrylamido-2-methylpropane sulfonic acid/N-N-dimethylacrylamide/acrylamide terpolymers, polyketones, acrylamide/t-butyl acrylate copolymers, oxidized polyvinyl alcohol, and water-soluble or water-dispersible polyesters (such as poly(lactic acid)), and mixtures and derivatives thereof. Those of ordinary skill in the art will recognize with the benefit of this disclosure that other polymers that react with chitosan may also be used in the present invention.

In certain embodiments, the chitosan-reacting polymer comprising a carbonyl group includes oxidized starch. Starches suitable for oxidation as in the present invention may include a number of starch-based compounds. Examples of suitable starches include, but are not limited to, corn starch, potato starch, waxy maize, dextrinized starch, and mixtures thereof. A wide variety of oxidizers can be used to oxidize starch. Examples of oxidizers suitable for use in the present invention include, but are not limited to, sodium hypochlorite, sodium periodate, hydrogen peroxide, peracetic acid, and mixtures thereof. Those skilled in the art with the benefit of this disclosure will appreciate that related oxidized polysaccharides, other than oxidized starch, can be used to crosslink with chitosan, including oxidized cellulose, oxidized agarose, oxidized partially-acetylated cellulose, oxidized gums, and mixtures thereof. Other compounds that may be used include dialdehyde starch (DAS), dialdehyde cellulose, and mixtures thereof. In certain embodiments, the oxidized polysaccharides contain at least some ketone, aldehyde, or anhydride functional groups upon oxidation.

Generally, by increasing the fraction of bulky or less reactive monomers in the chitosan-reacting polymer, the temperature at which gelation occurs may be increased and/or the pumping time at a given temperature may be increased. One of ordinary skill in the art with the benefit of this disclosure will recognize an appropriate chitosan-reacting polymer based on, among other factors, the temperature of the formation and the desired pumping time.

The chitosan-reacting polymer should be present in the crosslinkable-polymer compositions of the present invention in an amount sufficient to provide the desired pumping time before gelation and the desired crosslinking reaction. In certain embodiments, the chitosan-reacting polymers may be present in an amount in the range of from about 0.5% to about 20% by weight of the composition. In certain embodiments, the chitosan-reacting polymers may be present in an amount in the range of from about 0.6% to about 12% by weight of the composition.

To further modify the pumping time before gelation and other properties of the crosslinkable-polymer compositions of the present invention, the weight ratio of the chitosan-reacting polymer to the chitosan may be varied. In some embodiments, the weight ratio of chitosan-reacting polymer-to-chitosan may be in the range of from about 400:1 to about 1.1:1. In some embodiments, the weight ratio of chitosan-reacting polymer-to-chitosan may be in the range of from about 50:1 to about 1.1:1.

The crosslinkable-polymer compositions of the present invention may further comprise a gelation-retarding additive. Among other things, the gelation retardation additive may act to retard the reaction between the chitosan and the chitosan-reacting polymer, e.g., the gelation of the crosslinkable-polymer compositions. Delaying the gelation of the crosslinkable-polymer compositions may be desirable to increase the pumping time before gelation at a given temperature. In certain embodiments, the crosslinkable-polymer compositions of the present invention may have a gelation time of from about 2 hours to about 96 hours. In certain embodiments, the crosslinkable-polymer compositions of the present invention may have a gelation time sufficient to allow delivery of the crosslinkable-polymer composition to the desired portion of a subterranean formation before crosslinkable-polymer composition becomes substantially viscosified. The addition of a gelation-retarding additive may allow the crosslinkable-polymer compositions of the present invention to be used at higher temperatures than would otherwise be possible without the gelation-retarding additive. In addition to the amount and type of gelation-retarding additive included in the crosslinkable-polymer compositions of the present invention, the gelation time varies depending on a number of factors, including the type of crosslinking agent used, the type of the chitosan-reacting polymer used, the type of aqueous fluid used, concentrations of components used, the pH, the temperature, and a variety of other factors.

Gelation-retarding additives suitable for use in the crosslinkable-polymer compositions of the present invention may include an acid derivative. Examples of suitable acid derivatives may include organic acid derivatives and inorganic acid derivatives. Organic acid derivatives include, but are not limited to, carboxylic acid anhydrides, organic sulfonic acid derivatives such as, for example, sulfonyl chloride, and sulfanamides, and the like. Specific examples include, but are not limited to, sulfanilbenzoic acid, sulafanilamide, sulfanilic acid, Chloramine T, Chloramine B, and the like. Inorganic acid derivatives include, but are not limited to, acid chlorides, esters and amides of mineral acids such as, for example, chlorosulfonic acid, sulfamide, dialkyl carbonate, dimethyl carbonate, and mixtures thereof. Examples of carboxylic acid anhydrides include, but are not limited to, acetic anhydride, propionic anhydride, succinic anhydride, maleic anhydride, and mixtures thereof and derivatives thereof. Generally, the acid derivatives of the present invention may have some water solubility or some water dispersibility. Other carboxylic acid derivatives suitable for gel time extension include, but are not limited to esters, acid chlorides, amides, and mixtures thereof. Specific examples of these classes include, but are not limited to, acetyl chloride, butyl acetate, acetamide, and mixtures thereof.

The gelation-retarding additive generally should be included in the crosslinkable-polymer compositions of the present invention in an amount sufficient to provide the desired retardation of gelation. In certain embodiments, the gelation-retarding additive may be present in an amount in the range of from about 0.1% to about 10% by weight of the composition. The pH may be adjusted to a desired value, such as between about 4 to about 7.

The crosslinked gel formed by the reaction of the chitosan-reacting polymer and the chitosan should be stable for the desired period of time at the temperature of the subterranean formation. A relatively short gel stability may be preferred for temporarily sealing a portion of a subterranean formation, while a crosslinked gel having a long term stability may be useful in mitigating the flow of water from a formation into the well bore in producing wells or in sealing off high-permeability portions of a subterranean formation that would otherwise accept most of an injected treatment fluid.

Generally, the methods of the present invention allow for treating a portion of a subterranean formation with the crosslinkable-polymer compositions of the present invention. In certain embodiments, a method of treating a portion of a subterranean formation comprises: providing a crosslinkable-polymer composition comprising an aqueous fluid, chitosan, a chitosan-reacting polymer, and a gelation-retarding additive comprising an acid derivative; introducing the crosslinkable-polymer composition into the portion of the subterranean formation; and allowing the crosslinkable-polymer composition to form a crosslinked gel in the portion of the subterranean formation. By modifying the permeability of a portion of a subterranean formation, the crosslinked gel should mitigate the undesired flow of fluids therethrough. In some embodiments, mitigation of the flow may eliminate or at least reduce the fluid flow therethrough. In another embodiment, mitigation of the fluid flow may divert a treatment fluid, such as an acidizing treatment fluid, from a high-permeability, water-producing portion of a formation to the desired treatment area of a hydrocarbon-producing portion of the formation.

In certain embodiments, a method of diverting a treatment fluid in a subterranean formation comprises: providing a crosslinkable-polymer composition comprising an aqueous fluid, chitosan, a chitosan-reacting polymer, and a gelation-retarding additive comprising an acid derivative; introducing the crosslinkable-polymer composition into a portion of the subterranean formation; allowing the crosslinkable-polymer composition to form a crosslinked gel in the portion of the subterranean formation; providing the treatment fluid; introducing the treatment fluid into the subterranean formation; and allowing the crosslinked gel to at least substantially divert the treatment fluid to another portion of the subterranean formation. The diversion of treatment fluids in subterranean operations may be desirable in a variety of subterranean operations, including acid stimulation operations, injection operations, scale inhibition operations, and clay stabilization operations. In many instances, diversion may be desirable because the treatment fluid may preferentially enter portions of a subterranean formation with high permeability at the expense of portion of the subterranean formation with less permeability.

To facilitate a better understanding of the present invention, the following example of certain aspects of some embodiments is given. In no way should the following example be read to limit, or define, the scope of the invention.

EXAMPLE

Various sample fluids were prepared by combining water, acetic anhydride, a chitosan solution (1% active in a 1% acetic acid solution); an acrylamide-t-butylacrylate solution (20% active in water) and sufficient solid potassium chloride to provide a 2% salt concentration by weight of the sample fluid. The pH was adjusted to about 6.0 by the addition of a 10% by weight sodium hydroxide solution. The amount of acetic anhydride included in each sample fluid was varied. Table 1 shows the compositions of the sample fluids that were prepared.

TABLE 1

| | Sample Fluid Compositions | | | |
|---|---|---|---|---|
| Component | Sample Fluid No. 1 | Sample Fluid No. 2 | Sample Fluid No. 3 | Sample Fluid No. 4 |
| 1% Active Chitosan (ml/100 ml sol'n) | 50.00 | 50.00 | 50.00 | 50.00 |
| 20% Active Acrylamide-t-butylacrylate (ml/100 ml sol'n) | 35.00 | 35.00 | 35.00 | 35.00 |
| Acetic Anhydride (ml/100 ml sol'n) | 0.00 | 0.80 | 1.20 | 1.70 |
| KCl (gm) | 2.00 | 2.00 | 2.00 | 2.00 |
| Water (ml/100 ml sol'n) | 13.00 | 12.20 | 11.80 | 11.30 |

Once prepared, gelation times of the crosslinkable-polymer compositions were measured at various temperatures for the various sample fluids. The gelation times for the sample fluids were measured using a sealed-tube method. A 16 mm×150 mm borosilicate glass tube with a cap was filled with a sample fluid to approximately one-third of its capacity. The tube was purged with nitrogen, and the screw cap was sealed with a high-temperature silicone sealant. Additionally, a Teflon® plug was used inside the cap. The tube was then placed inside a heavy steel container, and the container was placed in a preheated oven set at the test temperature indicated in Table 2. The steel container was taken out periodically and the tube removed for observation. The gelation time for this example was the time required for the sample fluid to reach a specified gel strength based on the visual evaluation.

Table 2 shows gelation time measurements for each of the sample fluids that were prepared.

TABLE 2

| | Gelation Time Measurements | | | |
|---|---|---|---|---|
| | Gelation Time (hours) | | | |
| Temperature (° F.) | Formulation 1 Acetic Anyhdride Concentration 0 wt % | Formulation 2 Acetic Anyhdride Concentration 0.83 wt % | Formulation 3 Acetic Anyhdride Concentration 1.17 wt % | Formulation 4 Acetic Anyhdride Concentration 1.67 wt % |
| 175 | 48.05 | — | — | — |
| 200 | 8.57 | — | — | — |
| 225 | 2.35 | 4.5 | 6 | — |
| 250 | 1 | 2.75 | 4.75 | 10.5 |
| 275 | 0.75 | 1.5 | 2.5 | 9.5 |
| 300 | 0.5 | 0.75 | 1.5 | 6.25 |
| 325 | 0.5 | 0.75 | 1.25 | 5.5 |

Thus, these results show that gelation retardation additives comprising acetic anhydride may increase the gelation time of crosslinkable-polymer compositions.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method of treating a portion of a subterranean formation, comprising:
   providing a crosslinkable-polymer composition comprising an aqueous fluid, chitosan, a chitosan-reacting polymer, and a gelation-retarding additive comprising an acid derivative with the proviso that the gelation-retarding additive is not a polymer;
   introducing the crosslinkable-polymer composition into the portion of the subterranean formation; and
   allowing the crosslinkable-polymer composition to form a crosslinked gel in the portion of the subterranean formation.

2. The method of claim 1 wherein the chitosan is present in an amount in the range of from about 0.05% to about 5% by weight of the composition.

3. The method of claim 1 wherein the chitosan-reacting polymer is present in an amount in the range of from about 0.5% to about 20% by weight of the composition.

4. The method of claim 1 wherein the chitosan-reacting polymer comprises a carbonyl group.

5. The method of claim 1 wherein the chitosan-reacting polymer comprises an acrylamide-based polymer.

6. The method of claim 1 wherein the chitosan-reacting polymer comprises at least one polymer selected from the group consisting of: polyacrylamide; an acrylamide copolymer; polyvinyl pyrrolidone; a 2-acrylamido-2-methylpropane sulfonic acid/acrylamide copolymer; a sulfonated styrene/maleic anhydride copolymer; a vinylpyrrolidone/2-acrylamido-2-methylpropane sulfonic acid/acrylamide terpolymer; a 2-acrylamido-2-methylpropane sulfonic acid/N-N-dimethylacrylamide/acrylamide terpolymer; a polyketone; an acrylamide/t-butyl acrylate copolymer; oxidized polyvinyl alcohol; poly(lactic acid); a water soluble polyester; and a water dispersible polyester.

7. The method of claim 1 wherein the chitosan-reacting polymer comprises an oxidized polysaccharide.

8. The method of claim 1 wherein the gelation-retarding additive is present in an amount in the range of from about 0.1% to about 10% by weight of the composition.

9. The method of claim 1 wherein the gelation-retarding additive comprises at least one compound selected from the group consisting of: a carboxylic acid anhydride and an organic sulfonic acid derivative.

10. The method of claim 1 wherein the gelation-retarding additive comprises at least one compound selected from the group consisting of: an ester; an acid chloride; and an amide.

11. The method of claim 1 wherein the gelation-retarding additive comprises at least one compound selected from the group consisting of: sulfonyl chloride, sulfanamide, sulfanilbenzoic acid, sulafanilamide, sulfanilic acid, Chloramine T, and Chloramine B.

12. The method of claim 1 wherein the gelation-retarding additive comprises at least one compound selected from the group consisting of: propionic anhydride, succinic anhydride, and maleic anhydride.

13. The method of claim 1 wherein the gelation-retarding additive comprises at least one compound selected from the group consisting of: acetyl chloride, butyl acetate, and acetamide.

14. The method of claim 1 wherein the gelation-retarding additive comprises acetic anhydride.

15. The method of claim 1 wherein the crosslinkable-polymer composition has a gelation time of about 2 hours to about 96 hours.

16. A method of treating a portion of a subterranean formation, comprising:
   providing a crosslinkable-polymer composition comprising an aqueous fluid, chitosan, an acrylamide/t-butyl acrylate copolymer capable of reacting with the chitosan, and a gelation-retarding additive comprising acetic anhydride, wherein the crosslinkable-polymer composition has a gelation time sufficient to allow introduction of the crosslinkable-polymer composition into the portion of the subterranean formation;
   introducing the crosslinkable-polymer composition into the portion of the subterranean formation; and
   allowing the crosslinkable-polymer composition to form a crosslinked gel in the portion of the subterranean formation.

17. A method of diverting a treatment fluid in a subterranean formation comprising:
   providing a crosslinkable-polymer composition comprising an aqueous fluid, chitosan, a chitosan-reacting polymer, and a gelation-retarding additive comprising an acid derivative with the proviso that the gelation-retarding additive is not a polymer;
   introducing the crosslinkable-polymer composition into a portion of the subterranean formation;
   allowing the crosslinkable-polymer composition to form a crosslinked gel in the portion of the subterranean formation;
   providing the treatment fluid;
   introducing the treatment fluid into the subterranean formation; and
   allowing the crosslinked gel to at least substantially divert the treatment fluid to another portion of the subterranean formation.

18. The method of claim 17 wherein the acid derivative comprises at least one compound selected from the group consisting of: a carboxylic acid anhydride and an organic sulfonic acid derivative.

19. The method of claim 17 wherein the acid derivative comprises acetic anhydride.

20. The method of claim 19 wherein the chitosan-reacting polymer comprises an acrylamide-based polymer.

* * * * *